United States Patent [19]
Martin

[11] Patent Number: 5,971,110
[45] Date of Patent: Oct. 26, 1999

[54] ELECTRICALLY-OPERATED DISC BRAKE ASSEMBLIES FOR VEHICLES

[75] Inventor: Anthony Eugene Martin, Birmingham, United Kingdom

[73] Assignee: Lucas Industries public limited companuy, West Midlands, United Kingdom

[21] Appl. No.: 09/043,709

[22] PCT Filed: Sep. 20, 1996

[86] PCT No.: PCT/GB96/02319

§ 371 Date: Jun. 9, 1998

§ 102(e) Date: Jun. 9, 1998

[87] PCT Pub. No.: WO97/11287

PCT Pub. Date: Mar. 27, 1997

[30] Foreign Application Priority Data

Sep. 21, 1995 [GB] United Kingdom .................... 9519289
Nov. 1, 1995 [GB] United Kingdom .................... 9522312

[51] Int. Cl.[6] ...................................................... F16D 65/16
[52] U.S. Cl. ......................... 188/72.1; 188/72.8; 188/158; 188/71.8
[58] Field of Search ................... 188/72.1, 72.7, 188/72.8, 158, 156, 161, 162, 163, 72.3, 71.1, 72.6, 72.4, 71.8, 71.9, 196 BA; 310/83; 384/618, 619; 303/115.2; 74/424.8 R, 424.8 C

[56] References Cited

U.S. PATENT DOCUMENTS

| | | | |
|---|---|---|---|
| 4,567,967 | 2/1986 | Crossman | 188/72.8 |
| 4,596,316 | 6/1986 | Crossman | 188/72.1 |
| 4,793,447 | 12/1988 | Taig et al. | 188/72.1 |
| 4,804,073 | 2/1989 | Taig et al. | 188/72.1 |
| 4,809,826 | 3/1989 | Fargier et al. | 188/72.8 |
| 4,836,338 | 6/1989 | Taig | 188/72.1 |
| 4,850,457 | 7/1989 | Taig | 188/72.1 |
| 4,865,162 | 9/1989 | Morris et al. | 188/72.8 |
| 4,926,708 | 5/1990 | Dietrich et al. | 74/424.8 C |
| 4,944,372 | 7/1990 | Taig | 188/156 |
| 4,995,483 | 2/1991 | Moseley et al. | 188/72.1 |
| 5,107,967 | 4/1992 | Fujita et al. | 188/72.1 |
| 5,343,984 | 9/1994 | Bieker et al. | 188/71.9 |
| 5,348,123 | 9/1994 | Takahashi et al. | 188/162 |
| 5,788,023 | 8/1998 | Schöner et al. | 188/158 |
| 5,788,341 | 8/1998 | Penrod et al. | 188/162 |
| 5,829,557 | 11/1998 | Halary-Wimmer | 188/162 |

Primary Examiner—Douglas C. Butler
Attorney, Agent, or Firm—MacMillan, Sobanski & Todd, LLC

[57] ABSTRACT

In a brake assembly in which an electric motor operates to apply the brake through a screw device, the screw device comprises a recirculating roller screw assembly which is adapted to be driven from the electric motor through a gear train, and the roller screw assembly comprises a fine pitch recirculating roller screw.

5 Claims, 4 Drawing Sheets

ELECTRICALLY-OPERATED DISC BRAKE ASSEMBLIES FOR VEHICLES

This invention relates to improvements in electrically-operated disc brake assemblies for vehicles of the kind in which a friction member is adapted to be applied to a rotatable brake disc by a brake-applying means including an electric motor which forms part of the assembly, and transmission means in the form of a screw device adapted to apply an axially-directed brake-applying force to the friction member in response to operation of the motor.

A brake of the kind set forth is known from EP-A-0 339 024. In the brake of EP-A-0 339 024 the electric motor is used to drive an input to a reduction gearbox, and the gearbox is adapted to translate the high speed movement of the motor into a controlled high torque output to the screw device.

In the brake disclosed in EP-A-0 339 024, the reduction gearbox typically has a ratio of 115:1. Such a high gear reduction is required in order to provide a suitable control of the clamp force from the high speed low torque, electric motor. Gearboxes on this type are by their nature very large and complex. The gearbox disclosed in EP-A-0 339 024 is of an epicyclic design having many individual components. The output from the gearbox is operatively connected to the screw device, disclosed in EP-A-0 339 024 as a ball screw. The advantage of the ball screw over a typical acme thread is the improved efficiency of the drive. However all screws by virtue of their design are relatively large in diameter and relatively long in pitch for a given axial load. The large diameter required for the high axial load produces problems in terms of packaging, particularly when the device has to be installed in a restricted operating envelope, namely the limited space available within the confines of the wheel/disc assembly. The long pitch further compounds the gearbox reduction requirements to effect suitable control of the clamp loading from the high speed motor. The relatively large pitch of the ball screw has the disadvantage that it is then necessary for the gearbox to be of suitable high reduction in order to produce the overall fine control required to actuate the brake.

In GB-A-2 199 097 a motor is used via a gearbox, again of declared high reduction, to drive the input of a roller screw actuator. This has the advantage that a roller screw is able to support an equivalent axial load to that of the ball screw but on a screw diameter of small proportions. Therefore the packaging of the device into the above mentioned restricted operating envelope becomes significantly simpler.

We are also aware of U.S. Pat. No. 4,596,316 which discloses an aircraft brake assembly in which brake actuation is achieved by the operation of a roller screw drive mechanism. In this brake assembly a single stage gearbox in the form of a high reduction gearbox is used in conjunction with a ring gear which is extremely large in diameter. Such a mechanism is therefore entirely unsuitable for incorporation into, or for use in, a brake assembly of the kind set forth.

According to our invention in a brake assembly of the kind set forth the screw device comprises a recirculating roller screw assembly which is adapted to be driven from the electric motor through a gear train, and the roller screw assembly comprises a fine pitch recirculating roller screw, and in which the screw device further comprises inner and outer screw threaded members with the roller screw acting therebetween, and the inner member is constituted by two separate components comprising an inner tappet which is keyed against rotation, and a hollow screw keyed against relative movement in an axial direction with respect to the tappet.

Utilising a fine pitch recirculating roller screw lowers the inertia of all components for a given response for the brake assembly, and enables the gear ratio to be reduced since one turn of the screw represents a relatively small axial displacement in a brake-applying direction.

Using a recirculating roller screw of relatively fine pitch has the advantage that the small pitch adds to the overall gear reduction between the motor and the final output displacement. Therefore this improved gear reduction within the roller screw can be accounted for when determining the gear reduction required to be accommodated by the main gearbox. In very general terms the reduction required from the main gearbox can be reduced by 3 or 4 times to that which would be needed if a conventional ball screw or roller screw were being used. The smaller reduction requirement within the gearbox allows us to select from a wide variety of simpler gearbox designs, such as single state spur gears or a single worm drive. This has the effect of enabling us to produce a brake assembly having a reduced part count, the brake assembly being relatively smaller to facilitate installation, lighter in weight to reduce the overall inertia of the assembly, and cheap to produce in view of a reduction in the number of components.

Some embodiments of our invention are illustrated in the accompanying drawings.

Figure 1:
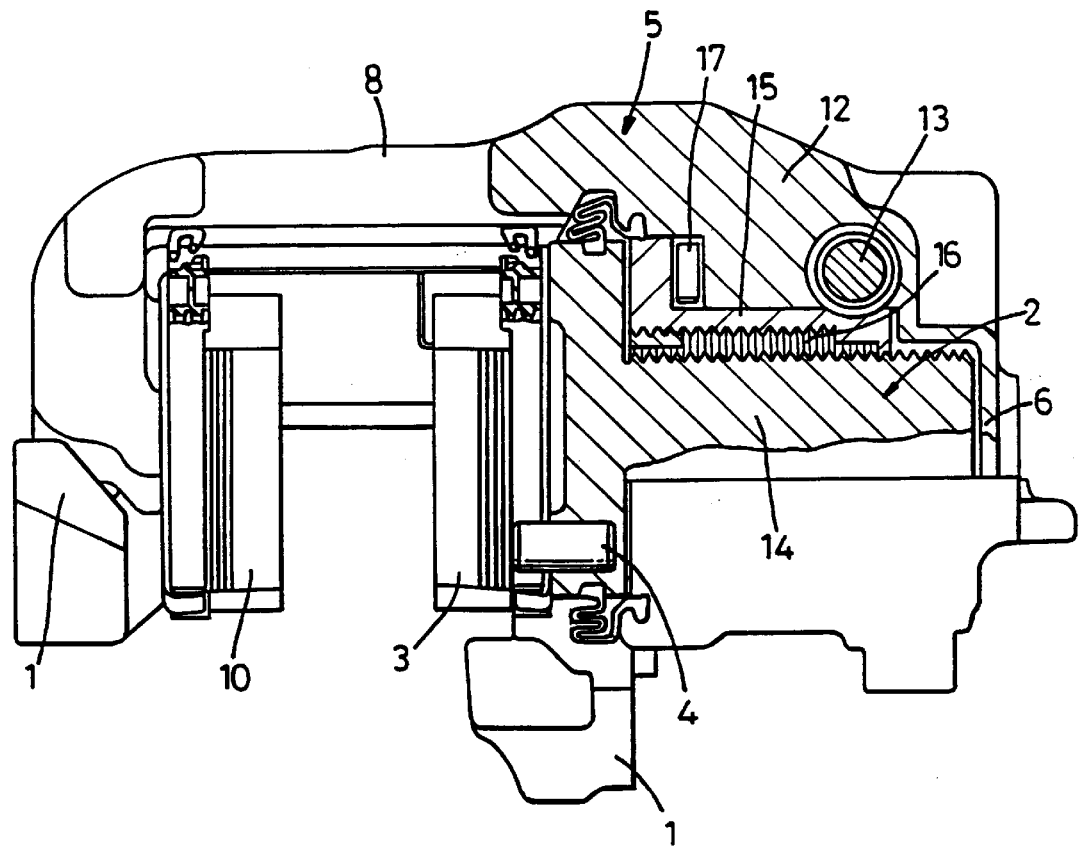
FIG. 1 is a longitudinal section through an electrically-operated disc brake assembly for a vehicle.

The disc brake illustrated in FIG. 1 of the accompanying drawings comprises a stationary brake carrier 1 fixed to a stationary part of the vehicle adjacent to one face of a brake disc (not shown), which is rotatable with a wheel of the vehicle. The carrier 1 houses a brake applying screw device 2, and a friction member 3, for engagement with an adjacent face to the disc, is mounted between the inner end of the screw device 2 and the disc and is guided for axial sliding movement towards and away from the disc on circumferentially spaced guide pins 4.

A caliper or clamping member 5 of generally U-shaped outline includes opposed limbs 6 and 7 interconnected by a bridge piece 8 is slidably mounted on the carrier 1 for movement in an axial direction. The limb 6 co-operates with the outer end of the carrier 1, and the limb 7 carries a friction member 10 for engagement with the opposite face of the rotatable disc.

An electric motor 12 is housed in the caliper 5 with its axis tangential to the disc. The motor 12 has a output shaft which transmits an output torque to a worm 13 through a screw device. The screw device 2 comprises inner and outer screw threaded members 14,15 with the screw threaded engagement therebetween being constituted by a re-circulating roller screw assembly in the form of a fine pitch re-circulating roller screw 16. The inner threaded member 14 is keyed against rotation so that rotation of the outer threaded member 15, in response to rotation of the worm 13, causes relative axial movement between the two members to take place. When this occurs in a brake-applying direction, the member 14 acts as a thrust member to generate a brake-applying force to apply the friction member 3 to the disc and the reaction of brake applying force is transmitted through the other member 15, in the form of a nut, and onto the caliper through a roller bearing 17. This causes bodily movement of the caliper 5 in the opposite direction, in turn to apply the friction member 10 to the opposite face of the disc.

Typically the maximum working axial load that the fine pitch re-circulating roller screw 16 must support will be substantially 40,000N. This dictates the size of the screw in terms of the size of the load carrying members, namely the rollers.

For a ball-screw, know from the prior art, for example EP-A-0 339 024 the finest pitch available that could be packaged would be 5 mm, although this could be increased to 10 mm in order to reduce the outside diameter of the screw assembly.

For a conventional planetary roller screw the same load could be supported within the desired outside diameter using the finest pitch available of 2 mm. Again this could be increased to 10 mm if the outside diameter of the screw device had to be reduced.

In the brake illustrated and described above with reference to FIG. 1 the fine pitch recirculating roller screw has a pitch substantially of 1 mm. This again could be increased as a result of outside diameter constraints.

The minimum or finest pitch of the ball screw of EP-A-0 339 024, namely 5 mm, would mean that in order to accommodate the drive of a motor rated at 5000 rpm no-load, a gearbox having a 40:1 reduction ratio would be required.

The minimum pitch of a planetary roller screw of 2 mm would need a gearbox of 16:1 reduction ratio.

In the brake illustrated in FIG. 1 of the accompanying drawings a fine pitch recirculating roller screw of a 1 mm pitch would require a gearbox of only an 8:1 reduction ratio.

Gearboxes that employ a reduction ratio in excess of 30:1 are, by virtue of the ratio required, multi-stage compound gear-train arrangements in construction. Below the 30:1 ratio, which we are able to achieve, much simpler gearbox designs can be used. Again by virtue of reduction ratio, such gearboxes are much lower in inertia than gearboxes of higher ratios.

The selection of the pitch of the fine pitch recirculating a roller screw 16 is dependent upon the overall diameter of the screw and hence the space available. Therefore, for a given space, the finest pitch is chosen so as to reduce the gearbox reduction requirements to a minimum. In the present construction, for the given load and the given space available within the envelope provided by a typical passenger car brake, the finest pitch selection of the fine pitch recirculating roller screw reduces the gearbox reduction ratio below the 10:1 limit which thus allows us to select a simple gearbox design of low inertia.

Figure 2:
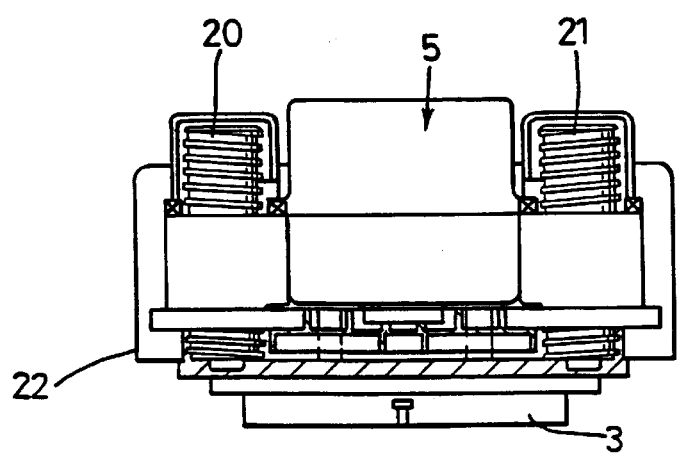
FIG. 2 is a plan of an actuating mechanism for an electrically-operated disc brake assembly, but including sections through circumferentially spaced screw devices.

In the brake illustrated in FIG. 2 of the accompanying drawings the friction member 3 is applied to the disc by means of a pair of circumferentially spaced fine pitch recirculating roller screws 20,21 which are driven from the electric motor 5 through a suitable reduction gear train 22. In this construction the axis of the motor coincides, substantially, with the axis of the brake.

Figure 3:
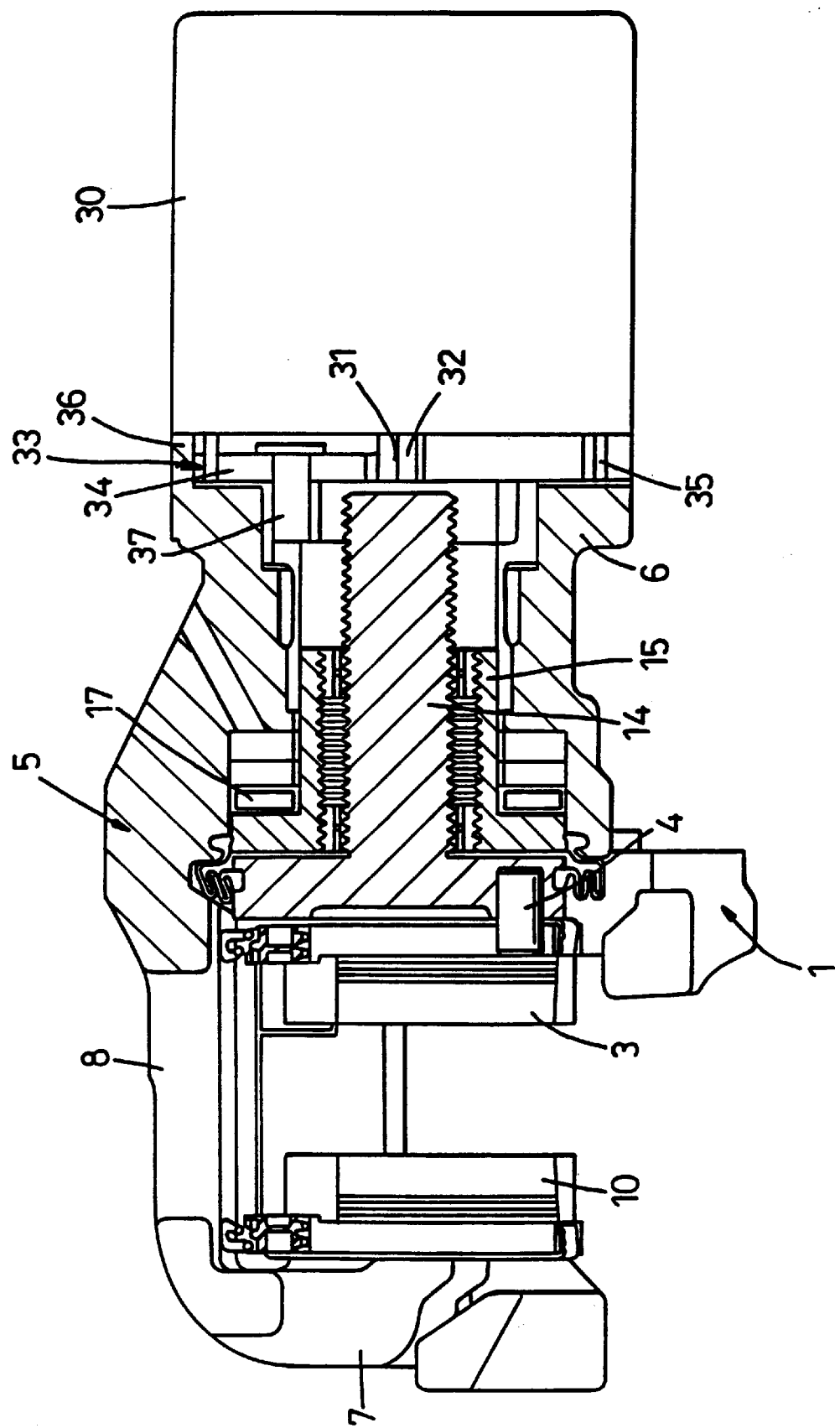
FIG. 3 is a longitudinal section through another electrically operated brake.

In the disc brake illustrated in FIG. 3 of the accompanying drawings, the electric motor 5 and the worm 13 are replaced by an electric motor contained within a housing 30 which is secured to the end of the limb 6 remote from the disc. The motor has an output shaft 31 which is co-axial with the axis of the screw threaded member 14 and carries a sun gear 32 forming part of an epicyclic gearbox 33 disposed between the electric motor 5 and the outer end of the limb 6. Three angularly spaced planet gears 34 mesh with the sun gear 31 and a ring gear 35 on the inner face of a housing 36 which contains the gearbox 33. The planet gears 34 are rotatably mounted on axially extending spindles 37 which, in turn, are keyed to the outer screw threaded member, or nut, 15.

When the electric motor 30 is operated to apply the brake rotation of the sun gear 32 causes the planet gears 34 to rotate around the ring gear 35, in turn causing the nut 15 to rotate, but at a reduced rate due to the bodily rotation of the spindles 35 about a pitch circle of constant diameter.

We are able to achieve a reduction ratio of between 10:1 and 20:1.

The construction and operation of the brake of FIG. 3 is otherwise the same as that of FIG. 1 and corresponding reference numerals have been applied to corresponding parts.

Figure 4:
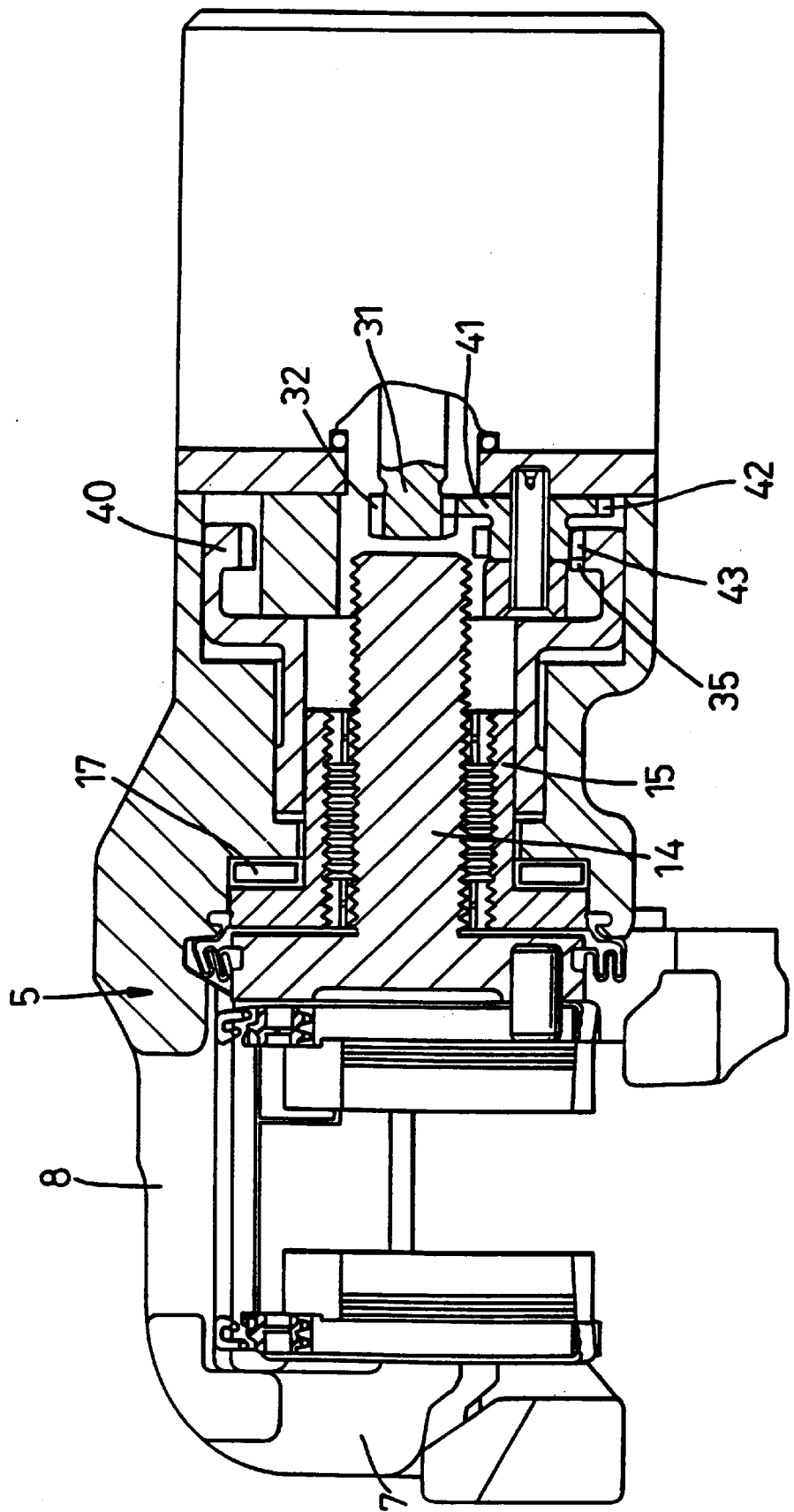
FIG. 4 is a longitudinal section similar to FIG. 3 but showing a modification.

In the brake illustrated in FIG. 4 of the accompanying drawings, the epicyclic gearbox 33 is replaced by a compound epicyclic gearbox 40. In this construction three angularly spaced planet gears 41 of compound construction each have a first set of input teeth 42 of greater diameter for engagement by the sun gear 32, and a second set of output teeth 43 of smaller diameter which are spaced outwardly from the teeth 42 and engage with the ring gear 35.

In operation the provision of the compound planet gears 41 achieves a reduced ratio, between 20:1 and 30:1, compared with the ratio achieved with the gearbox of FIG. 3.

Figure 5:
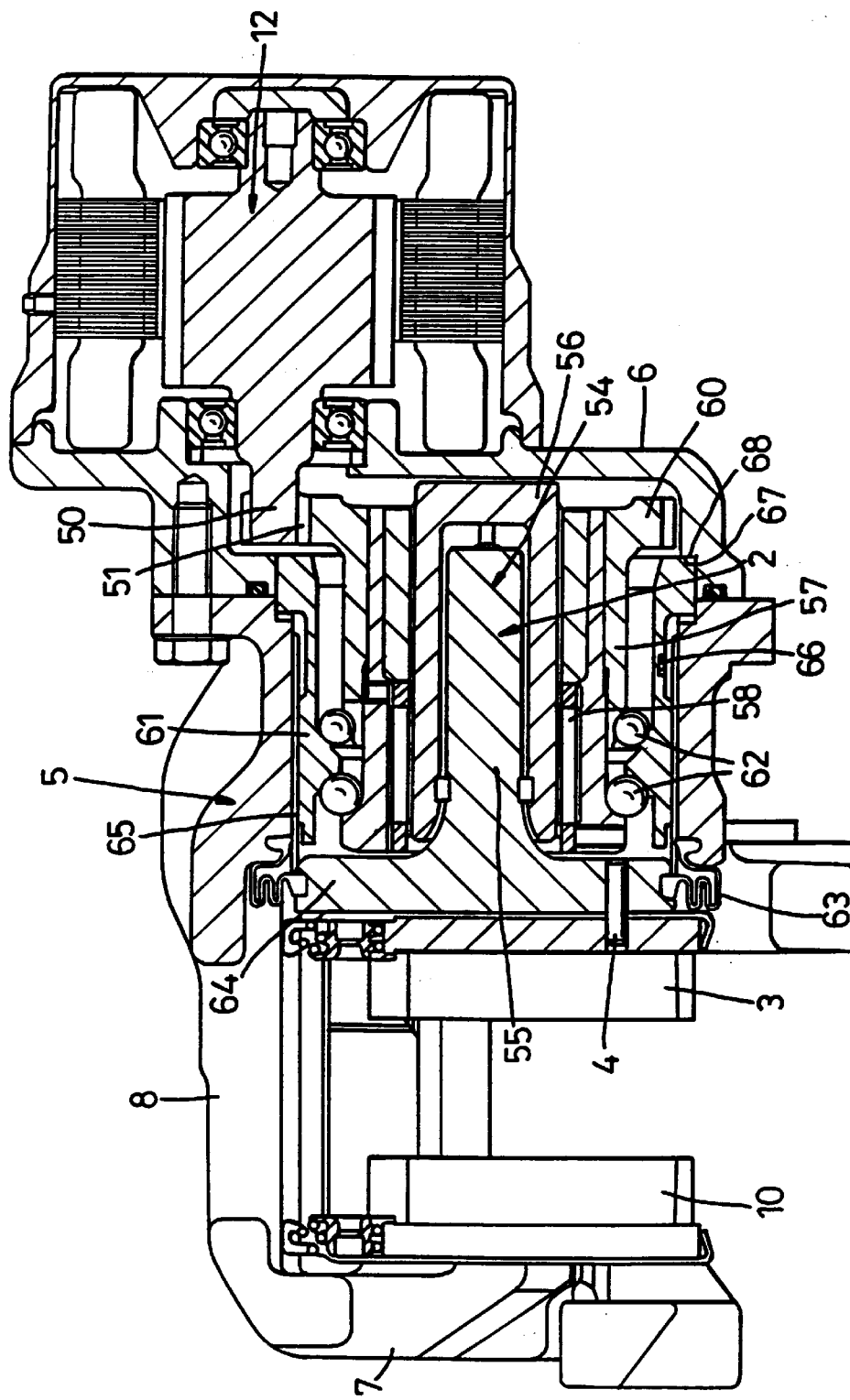
FIG. 5 is a longitudinal section also similar to FIG. 1 but showing a modification.

In the brake illustrated in FIG. 5 of the accompanying drawings, the electric motor 12 is carried from the outer end of the limb 6 with the motor 12 offset radially with respect to the axis of the brake in an inward direction to facilitate the installation in a region surrounding a suspension strut when the brake is installed in a vehicle. The motor 12 has an output shaft 50 which transmits an output torque to the screw device 2 through a simple spur gear 51.

The screw device comprises an inner member 54 in the form of a tappet having an axial stem 55 and which is keyed against rotation by the guide pins 4, an intermediate hollow screw 56 which is rotatable with respect to the tappet, but which is keyed against relative movement thereto in an axial direction, and an outer cylindrical nut 57 which encircles the screw 56 with a screw threaded engagement therebetween constituted by a re-circulating roller screw assembly in the form of a fine pitch re-circulating roller screw 58. The nut 57 has a toothed flange 60 with which the spur gear 51 meshes.

An outer can shield 61 of cylindrical outline encircles and co-operates with the nut 57 through an oppositely directed double annular contact bearing 62 to take thrust and side loads. The can shield 61 supports a sealing bolt 63 providing an annular seal between an enlarged head 64 on the tappet 55 and acts as a low friction interface with a bore 65 in the limb 6 to allow load to be fed through to a strain gauge or load cell 66 to provide an indication of force feed back.

A face 67 on the shield 61 is adapted to co-operate with an annular force taking shoulder 68 in the limb 6.

When the brake is applied, operation of the electric motor causes rotation of the nut 57 through the co-operation between the spur 51 and the toothed flange 60. This movement is transmitted to the screw through the roller screw 58, to cause the screw 58 to advance towards the disc, in turn carrying the tappet 54 with it to apply the friction member 3 to the disc. The reaction of the brake-applying force is transmitted through the nut 57 and onto bearing 62 by the co-operation of the shield 61 with the limb 6. This causes bodily movement of the caliper 5 in the opposite direction, in turn to apply the friction member 10 to the opposite face of the disc.

In this construction the shield 61 acts as a bearing between the screw device and the caliper, reduces friction therebetween, and earths out the reaction load onto the force taking shoulder 68. As the friction members wear, the forward end of the shield 61 acts to support the inner face of the sealing boot 63 thereby reducing the possibility of damage due to impact by small objects.

The construction and operation of the brake of FIG. 5 is otherwise the same as that of FIG. 1, and corresponding reference numerals have been applied to corresponding parts.

I claim:

1. An electrically operated disc brake assembly for a vehicle in which a friction member is adapted to be applied to a rotatable brake disc by brake-applying means including an electric motor which forms part of the assembly, and transmission means in the form of a screw device adapted to apply an axially-directed brake-applying force to the friction member in response to operation of the motor, characterized in that the screw device comprises a recirculating roller screw assembly which is adapted to be driven from the electric motor through a gear mechanism and the roller screw assembly comprises a fine pitch recirculating roller screw, in which the screw device further comprises inner and outer screw threaded members with the roller screw acting therebetween, and in which the inner member is constituted by two separate components comprising an inner tappet which is keyed against rotation, and a hollow screw keyed against relative movement in an axial direction with respect to the tappet.

2. A brake assembly as claimed in claim 1, in which an outer can shield encircles and co-operates with the nut through bearing means and through which a reaction from the brake-applying force is transmitted to a caliper to move it in an opposite direction to apply a second friction member to an opposite face of the disc.

3. A brake assembly as claimed in claim 1, in which the friction member is adapted to be applied to the disc through a pair of circumferentially spaced fine pitch recirculating roller screws which are driven from the electric motor through a gear train.

4. A brake assembly as claimed in claim 1, in which the motor is contained within a housing secured to a limb remote from the disc.

5. A brake assembly as claimed in claim 4, in which the motor is offset radially with respect to the main axis of the brake, and the motor has an output shaft which transmits torque to the screw device through a spur gear.

* * * * *